Feb. 16, 1926.

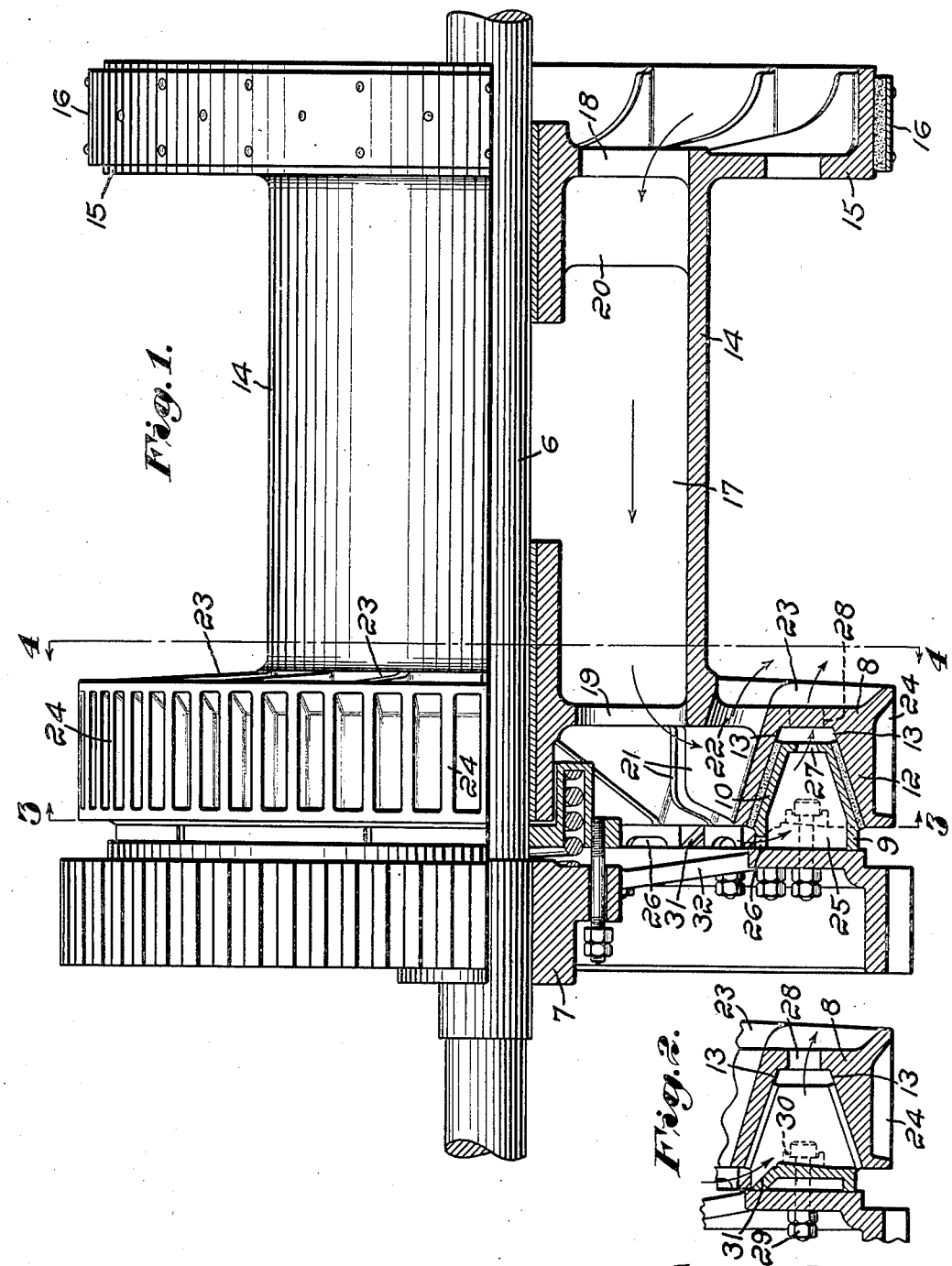

A. E. NORRIS 1,573,324

FRICTION CLUTCH

Filed June 30, 1924 2 Sheets-Sheet 2

Inventor:
Almon E. Norris,
by Attys.

Patented Feb. 16, 1926.

1,573,324

UNITED STATES PATENT OFFICE.

ALMON E. NORRIS, OF BROOKLINE, MASSACHUSETTS.

FRICTION CLUTCH.

Application filed June 30, 1924. Serial No. 723,078.

*To all whom it may concern:*

Be it known that I, ALMON E. NORRIS, a citizen of the United States, and a resident of Brookline, in the county of Norfolk and State of Massachusetts, have invented an Improvement in Friction Clutches, of which the following description, in connection with the accompanying drawings, is a specification, like characters on the drawings representing like parts.

This invention relates to a novel and improved friction clutch of the double cone type, having means for cooling the frictionally engageable clutch parts by air currents produced by the rotation of the clutch.

The invention will be best understood by reference to the following description, when taken in connection with the accompanying drawings of one illustrative embodiment thereof, while its scope will be more particularly pointed out in the appended claims.

In the drawings:

Fig. 1 is a half elevation and half section in a plane containing the axis of the clutch;

Fig. 2 is a similar partial sectional view in another plane containing the axis of the clutch;

Figure 4:
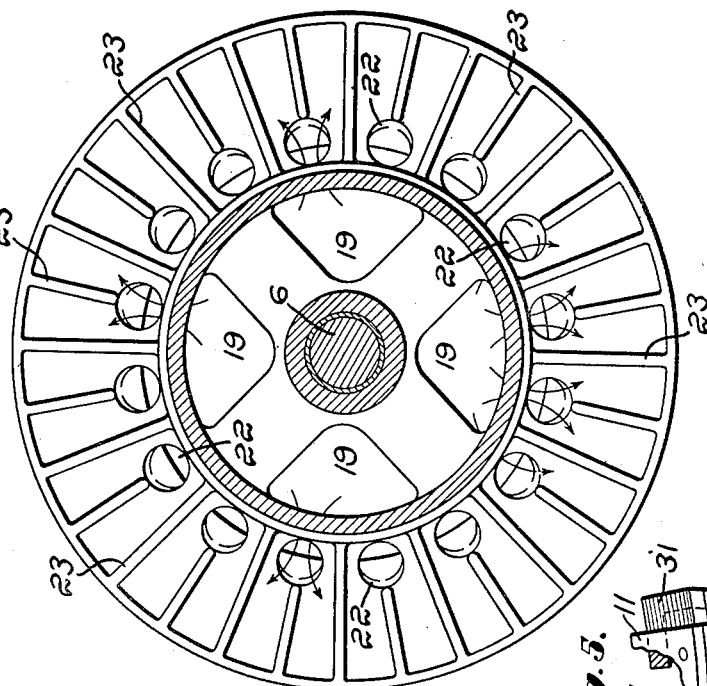
Fig. 4 is a sectional view on a reduced scale on line 4—4 of Fig. 1.

Referring first to Fig. 1 of the drawings, and to the embodiment of the invention which is selected for exemplification, there is shown a clutch comprising a shaft 6, on which two clutch members 7 and 8 are mounted for relative axial movement. Herein, the clutch member 7 is secured to the shaft, while the clutch member 8 is loosely mounted thereon. The clutch member 7 carries a series of friction blocks 9, one of which is shown in detail in Fig. 5. Each of these friction blocks is hollow, and has two walls 10, presenting oppositely inclined frusto-conical surfaces 11, while the member 8 has two walls 12, presenting oppositely inclined frusto-conical surfaces 13, engageable with the corresponding surfaces of the blocks. In other words, the walls 12 present between them a tapered groove, into which the blocks are forced by the wedging action. Herein, each friction block is formed of metal, and has its working surfaces faced with appropriate material, such as any one of the commonly employed compositions containing asbestos, used for lining clutches and brakes.

In the present example, the clutch is shown in connection with a hoisting drum 14, conveniently formed as an integral part of the clutch member 8, and carrying at its other end a brake-drum 15, which cooperates with a brake-band 16. In the use of clutches and brakes for hoisting drums, the duty is so severe, and the heat which is generated by the rubbing action of the frictional surfaces is so great, that in the present example, I have made the clutch and brake widely separated, in order that the heat generated by one shall not be imparted to the other, and have provided cooling means which will now be described.

The rope-winding drum is hollow, and presents a chamber 17, having an air inlet 18 adjacent the brake, and an outlet 19 adjacent the clutch. The body of air within this chamber is caused to rotate by radially-disposed ribs 20 within the rope-winding drum adjacent the inlets 18, and radially-disposed ribs 21 adjacent the outlet openings 19. Centrifugal force tends to throw this body of air in an outward direction, and to cause it to flow in the direction of the arrows from the chamber through the outlets 19, and radially outward toward the clutch surfaces. Some of this air escapes through a series of openings 22 presented by the clutch member 8, whence it passes along radial ribs 23, also presented by said member, said ribs serving not only to assist in causing rotation of the air, thereby to facilitate its outward flow, but also to increase the radiating surface of the clutch member. Further rotation is afforded by providing the outer wall 12 with ribs 24.

Figure 5:
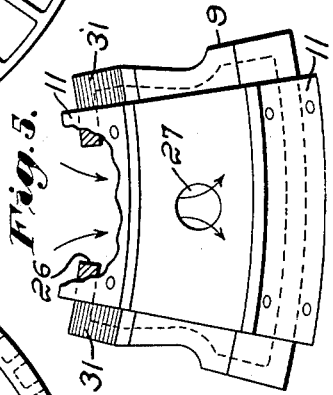
Fig. 5 is a detail end view, partly in section, illustrating one of the friction blocks on an enlarged scale, as compared with Figs. 1 and 2.
Figure 3:
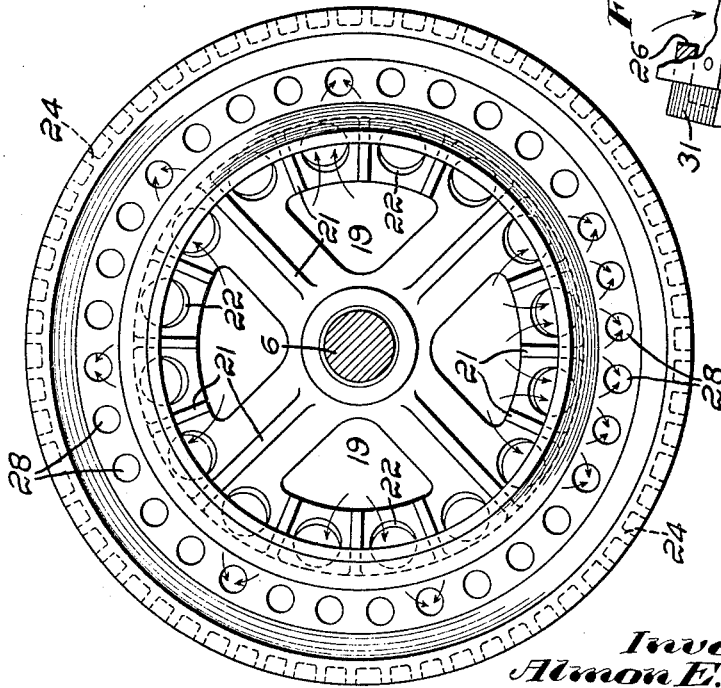
Fig. 3 is a sectional view on a reduced scale on line 3—3 of Fig. 1.

Turning now to the other clutch member, the friction blocks 9, which it will be remembered are hollow, present chambers 25 having inlets 26 and outlets 27 (see Figs. 1 and 5). The clutch member 8 is also provided with openings 28, affording a way of escape of the air from the outlets 27. Thus air currents introduced by centrifugal force are caused to enter the inlets 26, and pass thence between the walls 10, cooling the latter, after which the currents pass through the outlets 27, and escape through the openings 28.

The friction blocks are secured to the clutch member 7 by clamping bolts 29 and clamping blocks 30, intervening between adjacent ends of the friction blocks. At these points, further provision is made for the passage of air currents (see Fig. 2) by providing the friction blocks with inclined surfaces 31, which direct the air currents into the spaces between the friction blocks, whence the currents flow through the openings 28 presented by the clutch member 8. Thus it will be seen that the friction blocks are cooled internally, as well as on their spaced ends. In the present example, the clutch member 7 is provided with openings 32, which afford entrances for air which is added to that passing through the rope-winding drum, and is caused to flow along the clutch walls.

Having thus described one embodiment of the invention, but without limiting myself thereto, what I claim and desire by Letters Patent to secure is:

1. In a double cone friction clutch, the combination of two clutch members, each having walls presenting two oppositely inclined frusto-conical surfaces frictionally engageable with corresponding surfaces of the other member, and means for cooling said walls by utilizing the rotation of said members to cause air currents to flow along said walls in the general direction of the axis of said members.

2. In a double cone friction clutch, the combination of two clutch members, one having walls presenting between them an annular groove having oppositely inclined frusto-conical surfaces, and the other having walls presenting inclined frusto-conical surfaces frictionally engageable with the corresponding surfaces of the other member, and means for causing said walls to be cooled by air currents flowing along the non-engaging surfaces of both sets of walls lengthwise of the clutch axis.

3. In a double cone friction clutch, the combination of two clutch members, one having walls presenting between them an annular groove having oppositely inclined frusto-conical surfaces, and the other comprising a set of hollow blocks having walls presenting inclined frusto-conical surfaces frictionally engageable with the corresponding surfaces of the other member, and means for causing said walls to be cooled by air currents flowing lengthwise of the clutch axis, through said blocks and by air currents flowing between said blocks.

4. In a double cone friction clutch, the combination of two clutch members, one having walls presenting between them an annular groove having oppositely inclined frusto-conical surfaces, and the other comprising a set of hollow blocks having walls presenting inclined frusto-conical surfaces frictionally engageable with the corresponding surfaces of the other member, and means for causing said walls to be cooled by air currents flowing through and about said blocks.

5. In a friction clutch, the combination of two clutch members each having a pair of concentric walls, each pair presenting two friction surfaces one encircling the other engageable with the friction surfaces of the other pair, and means to cause the cooling of said walls by air currents passing in a generally axial direction over the other surfaces of said walls.

6. In a friction clutch, the combination of two clutch members each having a pair of concentric walls, each pair presenting two friction surfaces one encircling the other, engageable with the friction surfaces of the other pair, and means to utilize the rotation of the clutch to cause the cooling of said walls by air currents passing in a generally axial direction over the other surfaces of said walls.

7. In a double cone friction clutch, the combination of two clutch members having interengageable parts, each presenting two walls having frusto-conical friction surfaces engageable with corresponding surfaces of the other part, and means for causing the cooling of said clutch members by currents of air passing between said walls of one member and about the said walls of the other member.

8. In a double cone friction clutch, the combination of two clutch members having interengageable parts, each presenting two walls having frusto-conical friction surfaces engageable with corresponding surfaces of the other part, and means for causing the cooling of said clutch members by currents of air passing between and about said walls of both members.

In testimony whereof I have signed my name to this specification.

ALMON E. NORRIS.